US007167649B2

(12) United States Patent
Song et al.

(10) Patent No.: US 7,167,649 B2
(45) Date of Patent: Jan. 23, 2007

(54) DENSE WAVELENGTH DIVISION MULTIPLEXING-PASSIVE OPTICAL NETWORK SYSTEM UTILIZING SELF-INJECTION LOCKING OF FABRY-PEROT LASER DIODES

(75) Inventors: Jae-Won Song, Daegu (KR); Jong-Hoon Lee, Daegu (KR)

(73) Assignee: Jun-Kook Choi (KR)

( * ) Notice: Subject to any disclaimer, the term of this patent is extended or adjusted under 35 U.S.C. 154(b) by 650 days.

(21) Appl. No.: 10/678,005

(22) Filed: Oct. 1, 2003

(65) Prior Publication Data

US 2004/0067059 A1    Apr. 8, 2004

(30) Foreign Application Priority Data

Oct. 1, 2002    (KR) .................. 10-2002-0059873

(51) Int. Cl.
*H04J 14/00* (2006.01)

(52) U.S. Cl. .................. 398/72; 398/66; 398/67; 398/68; 398/79; 398/70; 398/71; 398/73; 398/82; 398/85; 398/98; 398/100; 398/91; 398/141; 398/149; 385/24; 385/37

(58) Field of Classification Search .................. 398/72, 398/66, 67, 68, 70, 141, 71, 85, 73, 149, 398/79, 91, 82, 195, 98, 100; 385/24, 37
See application file for complete search history.

(56) References Cited

U.S. PATENT DOCUMENTS 5,559,624 A * 9/1996 Darcie et al. .................. 398/72
5,991,058 A * 11/1999 Feuer et al. .................. 398/72

\* cited by examiner

*Primary Examiner*—Hanh Phan
(74) *Attorney, Agent, or Firm*—Cantor Colburn LLP (57) ABSTRACT

Disclosed is a dense wavelength division multiplexing-passive optical network (DWDM-PON) system utilizing self-injection locking of Fabry-Perot laser diodes, in which output optical signals of different wavelengths are partially fed back by a partial mirror, so as to injection-lock the Fabry-Perot laser diodes, respectively. In accordance with this system, inexpensive Fabry-Perot laser diodes can be used as respective light sources of a central office and optical network units (ONUs). Accordingly, it is possible to minimize the system construction costs, as compared to conventional optical networks.

8 Claims, 6 Drawing Sheets

DENSE WAVELENGTH DIVISION MULTIPLEXING-PASSIVE OPTICAL NETWORK SYSTEM UTILIZING SELF-INJECTION LOCKING OF FABRY-PEROT LASER DIODES

BACKGROUND OF THE INVENTION

1. Field of the Invention

The present invention relates to a dense wavelength division multiplexing (WDM)-passive optical network system, and more particularly to a dense WDM-passive optical network system utilizing self-injection locking of Fabry-Perot laser diodes, in which output optical signals of different wavelengths are partially fed back by a partial mirror, so as to injection-lock the Fabry-Perot laser diodes, respectively.

2. Description of the Related Art

Recently, demand for a network architecture based on an optical network has abruptly increased. Such an optical network-based network architecture can provide broadband multimedia services and high-speed and large-capacity Internet services. Interest in an optical network directly connected to optical network units (ONUs), using optical fibers, has also increased in order to provide broadband services to subscribers.

The most economical one of the currently used optical networks is a passive optical network (PON). The PON is a system in which a central office (CO), that is, a service provider, and ONUs, that is, service demanders, are configured only by passive optical elements.

In such a PON, typically, the connection between the central office and a remote node installed in an area adjacent to subscribers is achieved using a trunk fiber, whereas the connection between the remote node and each ONU is achieved using a distribution fiber, in order to minimize the total length of optical lines defined in the PON.

Such a PON has various advantages in that it is possible to reduce the initial installation costs while easily carrying out the maintenance and repair of the PON because the total length of optical lines defined in the PON is minimized, and subscribers share passive optical elements. By virtue of such advantages, use of such a PON is greatly increasing.

In particular, WDM-PON is being highlighted as a next-generation optical network meeting the needs of the information age of the future because it can provide a large quantity of information to each subscriber while maintaining high security levels and easily achieving an improvement in performance. In order to cope with an expansion of services and an increase in the number of subscribers, active research has also recently been conducted into a dense WDM-PON (DWDM-PON) which has a narrow channel gap, so that it has an increased number of channels, thereby being capable of providing a large quantity of information to an increased number of subscribers.

Figure 1:
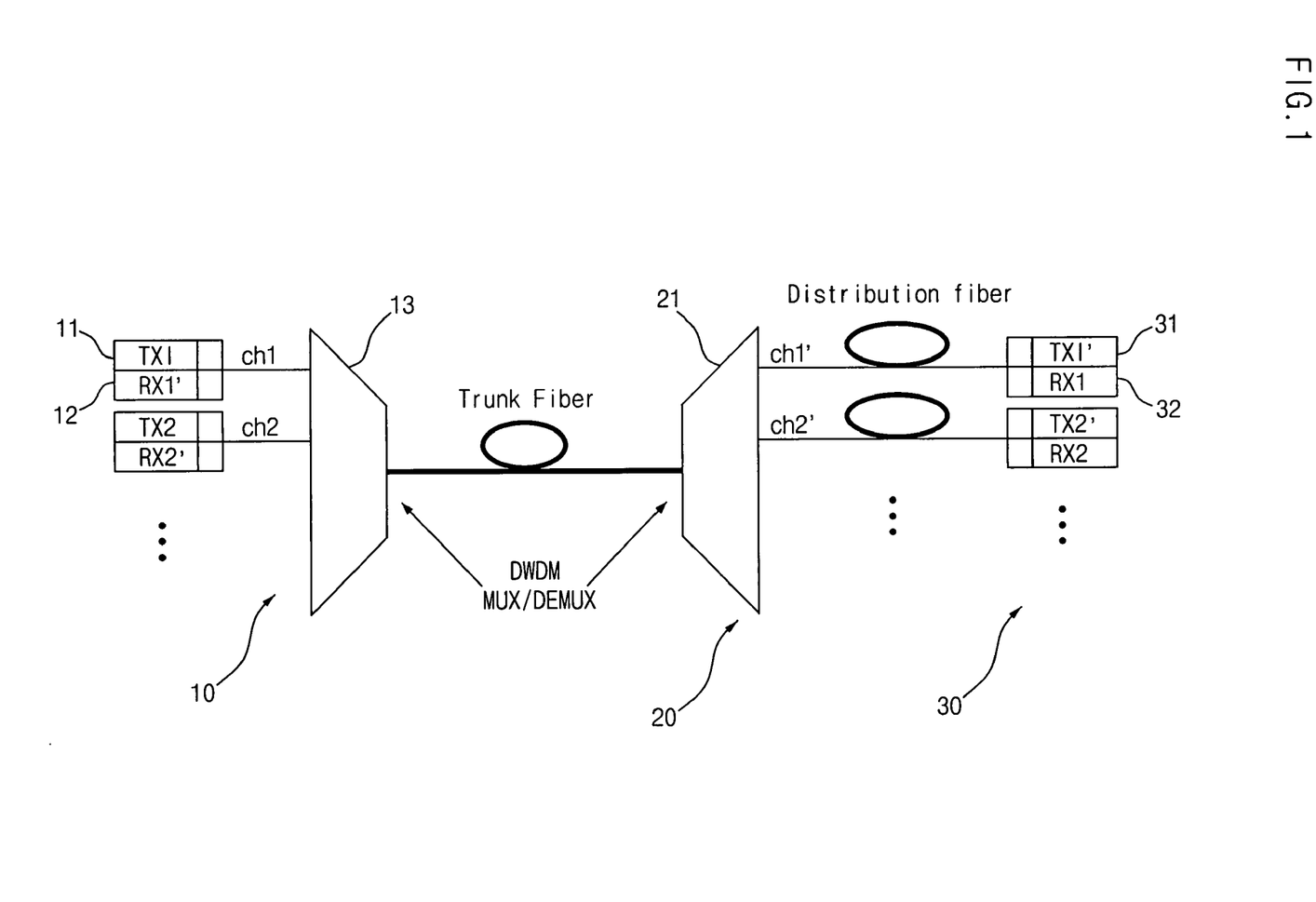
FIG. 1 is a schematic diagram illustrating the configuration of a conventional DWDM-PON system.

FIG. 1 is a schematic diagram illustrating the configuration of a conventional DWDM-PON system. As shown in FIG. 1, such a DWDM-PON is a system in which different wavelengths are assigned to respective subscribers by a central office so that the central office can simultaneously transmit data to the subscribers through a single optical communication line. Respective subscribers can also transmit data, using different wavelengths assigned thereto, respectively.

In order to assign different wavelengths to respective subscribers, this DWDM-PON should be equipped with light sources respectively adapted to provide different wavelengths corresponding to respective assigned wavelengths. In particular, there is a problem in that transmission nodes should use, as their light sources, expensive light sources such as distributed feedback laser diodes having a very narrow spectrum width, in order to minimize interference between adjacent wavelengths (channels).

Since such a conventional DWDM-PON uses light sources having a very narrow spectrum width, it is also necessary to use an additional device such as a temperature stabilizer or a current stabilizer, in order to stabilize oscillating wavelengths. As a result, there is a problem of high system construction costs. Furthermore, there is a problem in that optical signals of different wavelengths should be uniform because those optical signals must be transmitted to respective subscribers at a narrow wavelength gap.

In order to solve these problems, research has been conducted into economically constructing a DWDM-PON using commercially-available, inexpensive optical elements, and there are some associated research reports.

For example, there is a research report entitled "A low cost WDM source with an ASE injected Fabry-Perot semiconductor laser", IEEE Photonics Technology Letter, Vol. 12, no. 11, pp. 1067–1069, 2000. This research report discloses a method for economically implementing an optical network system by using an ASE (Amplified Spontaneous Emission) and an inexpensive Fabry-Perot laser diode as respective light sources of a central office and each ONU. In accordance with this method, an ASE outputted from the central office is injected into the Fabry-Perot laser diode of the ONU to lock the output wavelength of the Fabry-Perot laser diode at the same wavelength as that of the ASE (Hereinafter, this operation is referred to as "injection locking".). As a result, the Fabry-Perot laser diode can oscillate in a single mode, as a distributed feedback laser diode. However, this method has a drawback in that the central office must be equipped with a separate light source for generating an ASE.

There is another research report entitled "Upstream traffic transmitter using injection-locked Fabry-Perot as modulator for WDM access networks", Electronics Letters, Vol. 38, No. 1, pp. 43–44, 2002. This research report discloses a method for economically implementing an optical network system using a distributed feedback laser diode and a Fabry-Perot laser diode as respective light sources of a central office and each ONU. In accordance with this method, the ONU receives an optical signal outputted from the distributed feedback laser diode to use a part of the received optical signal for signal detection while using the remaining part of the received optical signal for injection locking. However, this method has a drawback in that the distributed feedback laser diode used as the light source of the central office is expensive.

SUMMARY OF THE INVENTION

The present invention has been made in view of the above mentioned problems, and an object of the invention is to provide a DWDM-PON system utilizing self-injection locking of Fabry-Perot laser diodes, in which output optical signals of different wavelengths are partially fed back by a partial mirror, so as to injection-lock the Fabry-Perot laser diodes, respectively.

Another object of the invention is to provide a DWDM-passive optical network system utilizing self-injection locking of Fabry-Perot laser diodes, in which inexpensive Fabry-Perot laser diodes are used as light sources, thereby minimizing the system construction costs.

In accordance with the present invention, these objects are accomplished by providing a dense wavelength division multiplexing-passive optical network system utilizing self-injection locking of Fabry-Perot laser diodes, the system comprising: a central office for generating first optical signals of different wavelengths, and transmitting the first optical signals to a remote node, while receiving second optical signals of different wavelengths from the remote node; the remote node for demultiplexing a multiplexed signal of the first optical signals transmitted from the central office, and transmitting the demultiplexed first optical signals to respective optical network units (ONUs), the remote node also multiplexing the second optical signals transmitted from respective ONUs, and transmitting the multiplexed signal of the second optical signals to the central office; and the ONUs for receiving the first optical signals transmitted from the remote node, respectively, the ONUs also generating the second optical signals of different wavelengths, and transmitting the second optical signals to the remote node, respectively, wherein the central office includes a first partial mirror adapted to partially feed back the multiplexed signal of the first optical signals transmitted to the remote node, thereby self-injection locking a plurality of first transmitters included in the central office, and wherein the remote node includes a second partial mirror adapted to partially feed back the multiplexed signal of the second optical signals transmitted to the central office, thereby self-injection locking a plurality of second transmitters included in respective ONUs.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, preferred embodiments of the present invention will be described in detail with reference to the annexed drawings.

Figure 2:
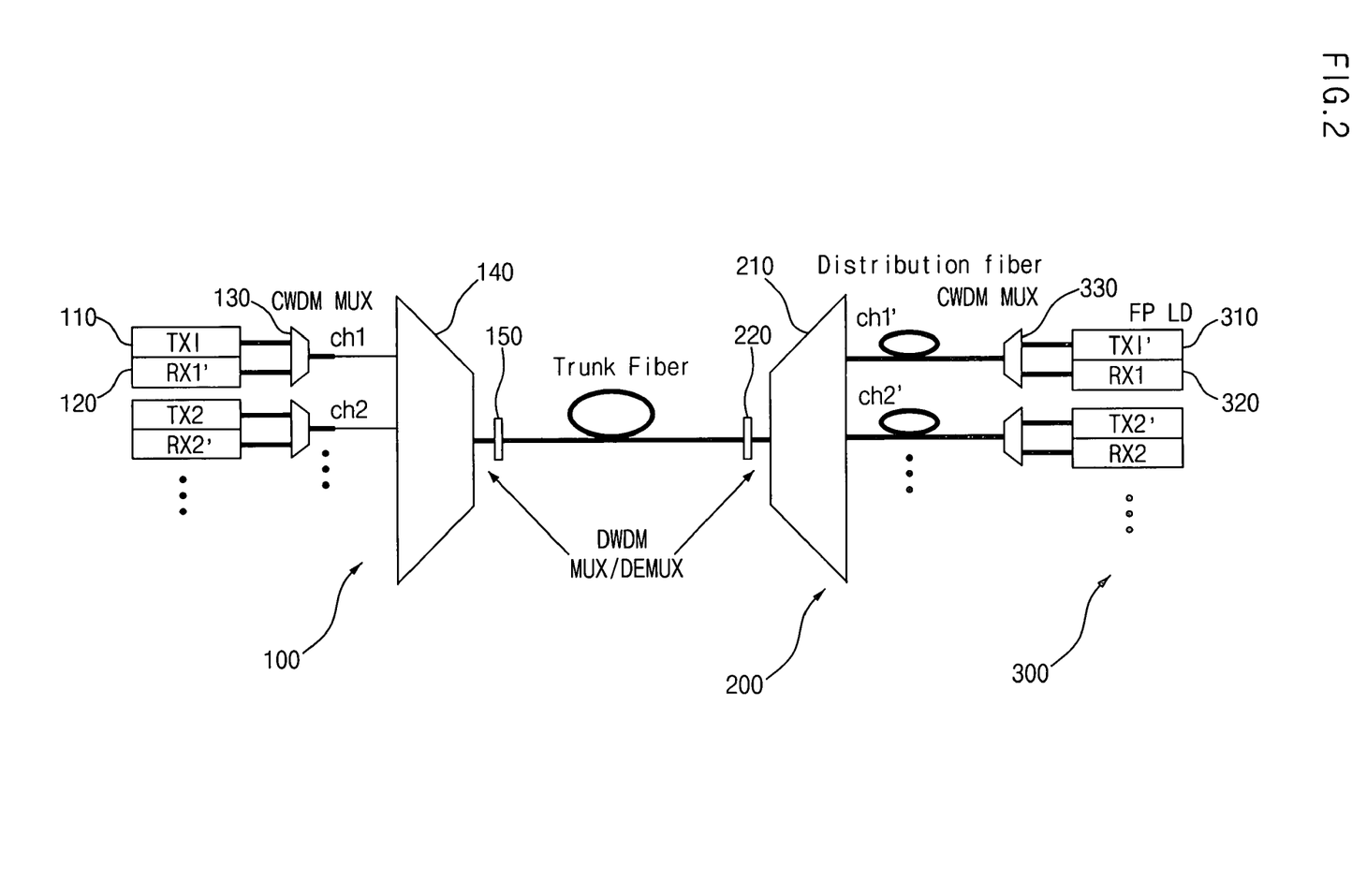
FIG. 2 is a schematic diagram illustrating the configuration of a DWDM-PON system according to an embodiment of the present invention.

FIG. 2 is a schematic diagram illustrating the configuration of a DWDM-PON system according to an embodiment of the present invention. As shown in FIG. 2, the DWDM-PON system includes a central office (CO) 100, a remote node (RN) 200, and a plurality of optical network units (ONUs) 300.

The central office 100 generates first optical signals of different wavelengths $\lambda_1, \lambda_2, \ldots \lambda_N$, and transmits the first optical signals to the remote node 200. The central office 100 also receives second optical signals of different wavelengths $\lambda_{N+1}, \lambda_{N+2}, \ldots \lambda_{2N}$ from the remote node 200. For such functions, the central office 100 includes a plurality of first transmitters 110 for outputting the first optical signals $\lambda_1, \lambda_2, \ldots \lambda_N$, respectively, a plurality of first receivers 120 for receiving the second optical signals $\lambda_{N+1}, \lambda_{N+2}, \ldots \lambda_{2N}$ transmitted from the remote node 200, respectively, a plurality of first multiplexers/demultiplexers 130 each adapted to output the first optical signal received from an associated one of the first transmitters 110 while demultiplexing an associated one of the second optical signals $\lambda_{N+1}, \lambda_{N+2}, \ldots \lambda_{2N}$ transmitted from the remote node 200 along with a part of the first optical signal fed back thereto, a second multiplexer/demultiplexer 140 for multiplexing the first optical signals $\lambda_1, \lambda_2, \ldots \lambda_N$ respectively outputted from the first multiplexers/demultiplexers 130 while demultiplexing a multiplexed signal of the second optical signals $\lambda_{N+1}, \lambda_{N+2}, \ldots \lambda_{2N}$ transmitted from the remote node 200 along with a part of a multiplexed signal of the first optical signals $\lambda_1, \lambda_2, \ldots \lambda_N$ fed back thereto, and a first partial mirror 150 for partially feeding back the multiplexed signal of the first optical signals $\lambda_1, \lambda_2, \ldots \lambda_N$ to the second multiplexer/demultiplexer 140.

The remote node 200 demultiplexes the multiplexed signal of the first optical signals $\lambda_1, \lambda_2, \ldots \lambda_N$ transmitted from the central office 100, and transmits the demultiplexed first optical signals $\lambda_{N+1}, \lambda_{N+2}, \ldots \lambda_{2N}$ to respective ONUs 300. The remote node 200 also multiplexes the second optical signals $\lambda_{N+1}, \lambda_{N+2}, \ldots \lambda_{2N}$ transmitted from respective ONUs 300, and transmits the multiplexed signal of the second optical signals $\lambda_{N+1}, \lambda_{N+2}, \ldots \lambda_{2N}$ to the central office 100. For such functions, the remote node 200 includes a third multiplexer/demultiplexer 210 for demultiplexing the multiplexed signal of the first optical signals $\lambda_1, \lambda_2, \ldots \lambda_N$ transmitted from the central office 100 while multiplexing the second optical signals $\lambda_{N+1}, \lambda_{N+2}, \ldots \lambda_{2N}$ transmitted from respective ONUs 300 along with a part of the multiplexed signal of the second optical signals $\lambda_{N+1}, \lambda_{N+2}, \ldots \lambda_{2N}$, and a second partial mirror 220 for partially feeding back the multiplexed signal of the second optical signals $\lambda_{N+1}, \lambda_{N+2}, \ldots \lambda_{2N}$, outputted from the third multiplexer/demultiplexer 210, to the third multiplexer/demultiplexer 210.

Respective ONUs 300 receive the first optical signals $\lambda_1, \lambda_2, \ldots \lambda_N$ transmitted from the remote node 200. The ONUs 300 also generate the second optical signals of different wavelengths $\lambda_{N+1}, \lambda_{N+2}, \ldots \lambda_{2N}$, and transmit the second optical signals $\lambda_{N+1}, \lambda_{N+2}, \ldots \lambda_{2N}$ to the remote node 200, respectively. For such functions, respective ONUs 300 include a plurality of second transmitters 310 for transmitting respective second optical signals $\lambda_{N+1}, \lambda_{N+2}, \ldots \lambda_{2N}$, a plurality of second receivers 320 for receiving respective first optical signals $\lambda_1, \lambda_2, \ldots \lambda_N$ transmitted from the remote node 200, and a plurality of fourth multiplexers/demultiplexers 330 each adapted to output the second optical signal received from an associated one of the second transmitters 310 while demultiplexing an associated one of the first optical signals $\lambda_1, \lambda_2, \ldots \lambda_N$ transmitted from the remote node 200 along with a part of the second optical signal fed back thereto.

In the illustrated embodiment, the multiplexed signal of the first optical signals $\lambda_1, \lambda_2, \ldots \lambda_N$ transmitted from the central office 100 is partially fed back to each first transmitter 110 of the central office 100. Also, the second optical signals $\lambda_{N+1}, \lambda_{N+2}, \ldots \lambda_{2N}$ transmitted from respective ONUs 300 are partially fed back to respective second transmitters 320 of the ONUs 300.

The operation of the DWDM-PON system according to the illustrated embodiment of the present invention will now be described in conjunction with a forward signal traveling from the central office 100 to the ONUs 300. When the central office 100 multiplexes the first optical signals $\lambda_1$, $\lambda_2$, ... $\lambda_N$, and transmits, to the remote node 200, the multiplexed signal of the first optical signals $\lambda_1$, $\lambda_2$, ... $\lambda_N$, the remote node 200 demultiplexes the multiplexed signal, and then outputs the demultiplexed first optical signals $\lambda_1$, $\lambda_2$, ... $\lambda_N$ to respective ONUs 300. Thus, the ONUs 300 receive the demultiplexed first optical signals $\lambda_1$, $\lambda_2$, ... $\lambda_N$, respectively.

Meanwhile, the DWDM-PON system operates in a reverse manner for a backward signals traveling from each ONU 300 to the central office 100.

Figure 3:
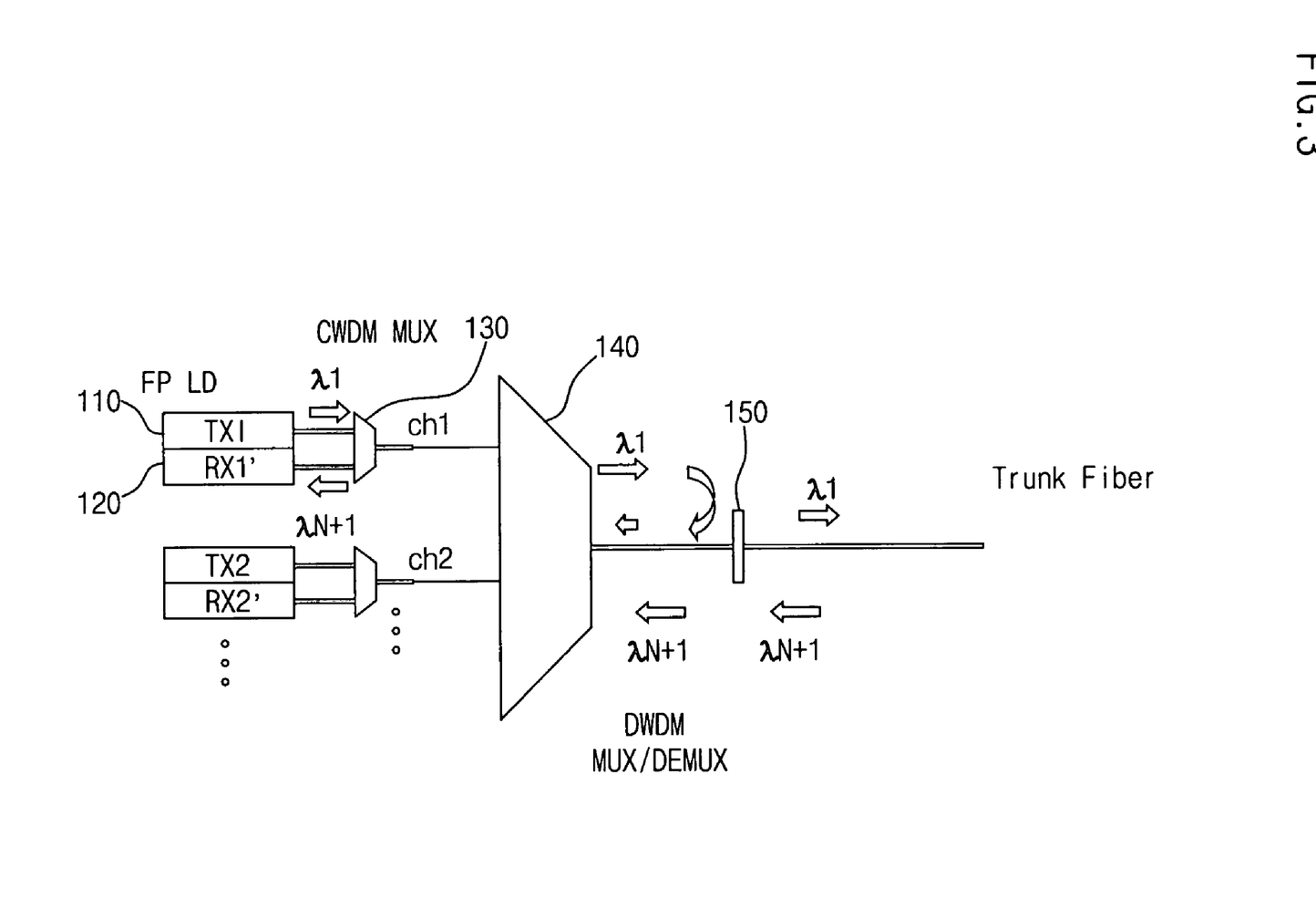
FIG. 3 is a schematic view illustrating the operation of an central office according to the present invention.

FIG. 3 is a schematic view illustrating the operation of the central office according to the present invention. The operation of the central office will be described in detail with reference to FIG. 3. When incoherent light of a narrow band, for example, a wavelength $\lambda_1$, is injected into a Fabry-Perot laser diode as the light source of an associated one of the first transmitters 110, the Fabry-Perot laser diode, which has a plurality of oscillating modes, oscillates in a mode corresponding to the wavelength of the injected light while suppressing its oscillation in other modes. Accordingly, the output wavelength of the Fabry-Perot laser diode is locked at the wavelength of the injected light (this phenomenon is called "injection locking"). In such a manner, the first transmitters 110 of the central office 100 generate the first optical signals of different particular wavelengths $\lambda_1$, $\lambda_2$, ... $\lambda_N$ in accordance with their particular oscillating modes, respectively, and transmit the generated first optical signals $\lambda_1$, $\lambda_2$, ... $\lambda_N$ to the associated first multiplexers/demultiplexers 130, respectively.

The first multiplexers/demultiplexers 130 output respective first optical signals $\lambda_1$, $\lambda_2$, ... $\lambda_N$, received from the associated first transmitters 110, to the second multiplexer/demultiplexer 140 which, in turn, multiplexes the first optical signals $\lambda_1$, $\lambda_2$, ... $\lambda_N$, and outputs the multiplexed signal of the first optical signals $\lambda_1$, $\lambda_2$, ... $\lambda_N$.

The multiplexed signal of the first optical signals $\lambda_1$, $\lambda_2$, ... $\lambda_N$ is partially fed back by the first partial mirror 150. In accordance with the feed-back operation of the first partial mirror 150, the first optical signals $\lambda_1$, $\lambda_2$, ... $\lambda_N$ are partially fed back, so that they are re-transmitted to the second multiplexer/demultiplexer 140, and thus, to respective first multiplexers/demultiplexers 130. For example, the second multiplexer/demultiplexer 140 demultiplexes the fed-back multiplexed signal of the first optical signals, and then transmits the demultiplexed first optical signals to respective first multiplexers/demultiplexers 130. Each first multiplexer/demultiplexer 130 injects the first optical signal having an associated wavelength, for example, the wavelength $\lambda_1$, into the associated first transmitter 110. Thus, the first transmitter 110 is injection-locked by the fed-back part of the first optical signal $\lambda_1$.

On the other hand, the second multiplexer/demultiplexer 140 receives the second optical signals $\lambda_{N+1}$, $\lambda_{N+2}$, ... $\lambda_{2N}$, and sends the received second optical signals $\lambda_{N+1}$, $\lambda_{N+2}$, ... $\lambda_{2N}$ to respective first receivers 120. The second multiplexer/demultiplexer 140 is of an AWG type, so that it can multiplex/demultiplex the first optical signals $\lambda_1$, $\lambda_2$, ... $\lambda_N$ and the second optical signals $\lambda_{N+1}$, $\lambda_{N+2}$, ... $\lambda_{2N}$ in a simultaneous manner.

Figure 4:
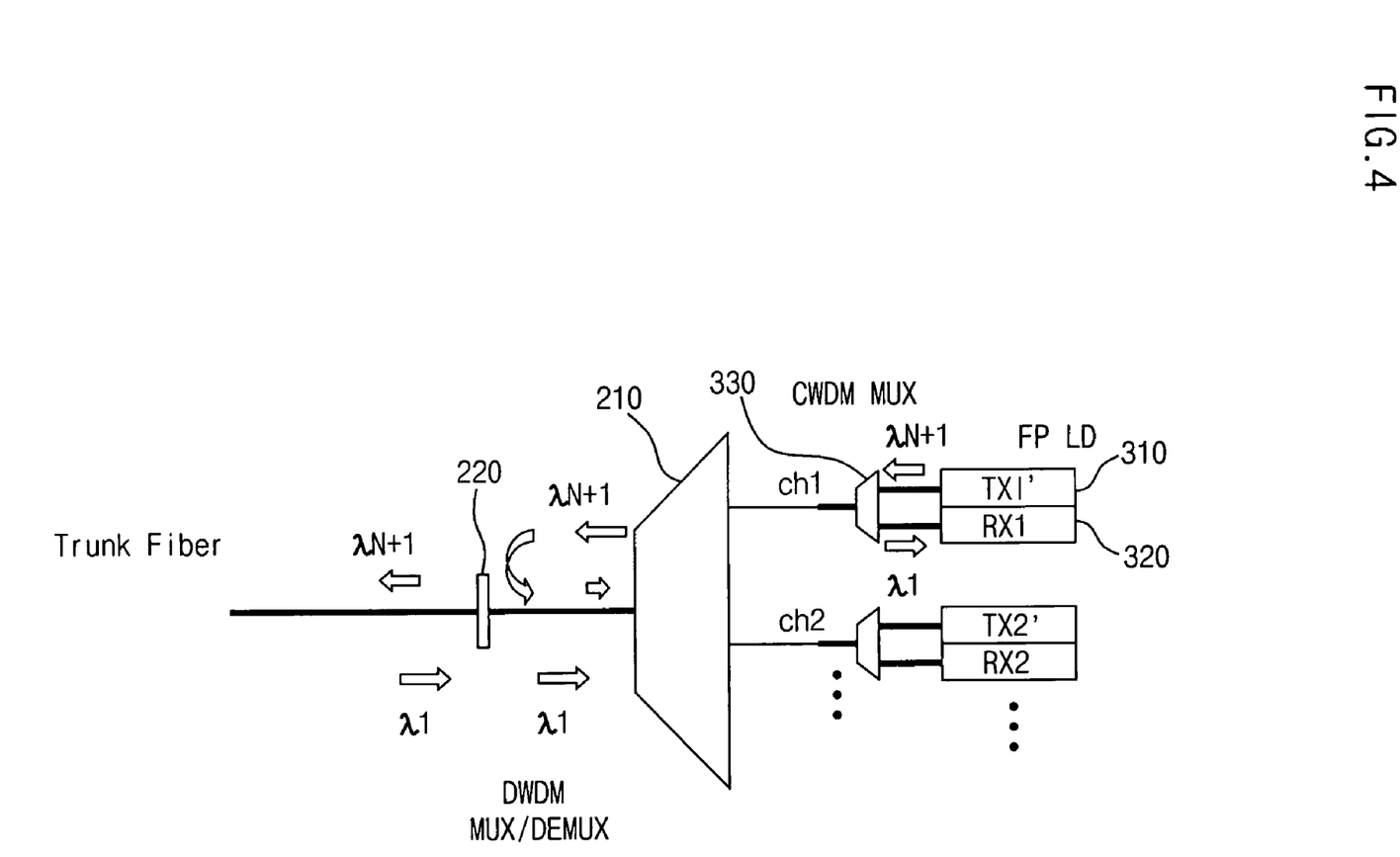
FIG. 4 is a schematic view illustrating the operations of a remote node and each ONU according to the present invention.

FIG. 4 is a schematic view illustrating the operations of the remote node and each ONU according to the present invention. When incoherent light of a narrow band, for example, a wavelength $\lambda_{N+1}$, is injected into a Fabry-Perot laser diode as the light source of an associated one of the second transmitters 310 included in respective ONUs 300, the Fabry-Perot laser diode, which has a plurality of oscillating modes, oscillates in a mode corresponding to the wavelength of the injected light while suppressing its oscillation in other modes. Accordingly, the output wavelength of the Fabry-Perot laser diode is locked at the wavelength of the injected light (this phenomenon is called "injection locking"). In such a manner, the second transmitters 310 of the ONUs 300 generate second optical signals of different particular wavelengths $\lambda_{N+1}$, $\lambda_{N+2}$, ... $\lambda_{2N}$ in accordance with their particular oscillating modes, respectively, and transmit the generated second optical signals $\lambda_{N+1}$, $\lambda_{N+2}$, ... $\lambda_{2N}$ to the associated fourth multiplexers/demultiplexers 330, respectively.

The fourth multiplexers/demultiplexers 330 output respective second optical signals $\lambda_{N+1}$, $\lambda_{N+2}$, ... $\lambda_{2N}$ transmitted thereto. The outputted second optical signals $\lambda_{N+1}$, $\lambda_{N+2}$, ... $\lambda_{2N}$ are then transmitted to the third multiplexer/demultiplexer 210 of the remote node 200. The third multiplexer/demultiplexer 210 multiplexes the second optical signals $\lambda_{N+1}$, $\lambda_{N+2}$, ... $\lambda_{2N}$, and outputs the multiplexed signal of the second optical signals $\lambda_{N+1}$, $\lambda_{N+2}$, ... $\lambda_{2N}$.

The multiplexed signal of the second optical signals $\lambda_{N+1}$, $\lambda_{N+2}$, ... $\lambda_{2N}$ is partially fed back by the second partial mirror 220. In accordance with the feed-back operation of the second partial mirror 220, the second optical signals $\lambda_{N+1}$, $\lambda_{N+2}$, ... $\lambda_{2N}$ are partially fed back, so that they are re-transmitted to the third multiplexer/demultiplexer 210, and thus, to respective fourth multiplexers/demultiplexers 330. For example, the third multiplexer/demultiplexer 210 demultiplexes the fed-back multiplexed signal of the second optical signals, and then transmits the demultiplexed second optical signals to respective fourth multiplexers/demultiplexers 330. Each fourth multiplexer/demultiplexer 330 injects the second optical signal having an associated wavelength, for example, the wavelength $\lambda_{N+1}$, into the associated second transmitter 310. Thus, the second transmitter 310 is injection-locked by the fed-back part of the second optical signal $\lambda_{N+1}$.

On the other hand, the third multiplexer/demultiplexer 210 receives the first optical signals $\lambda_1$, $\lambda_2$, ... $\lambda_N$, and sends the received first optical signals $\lambda_1$, $\lambda_2$, ... $\lambda_N$ to respective second receivers 320. The third multiplexer/demultiplexer 210 is of an AWG type, so that it can multiplex/demultiplex the first optical signals $\lambda_1$, $\lambda_2$, ... $\lambda_N$ and the second optical signals $\lambda_{N+1}$, $\lambda_{N+2}$, ... $\lambda_{2N}$ in a simultaneous manner.

Figure 5A:
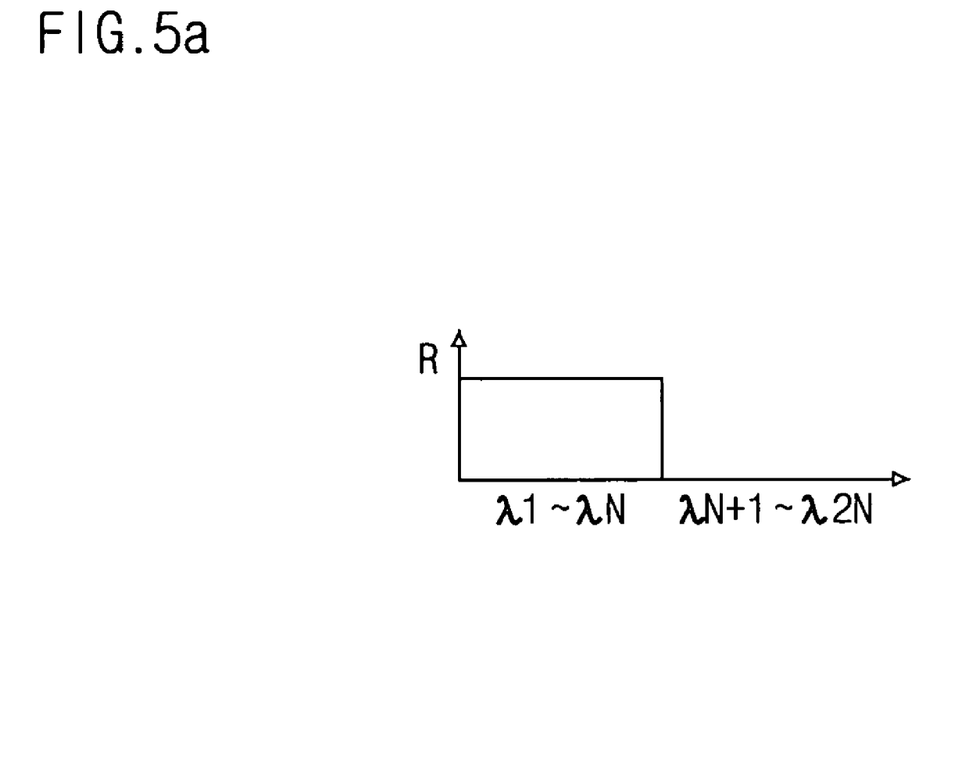
FIGS. 5a and 5b are graphs respectively depicting reflection characteristics of partial mirrors according to the present invention.
Figure 5B:
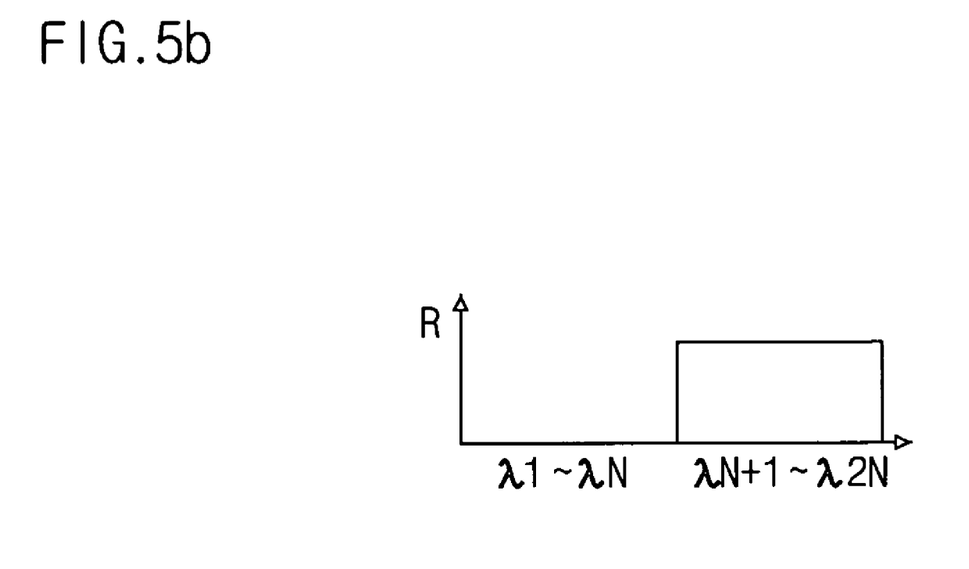

FIGS. 5a and 5b are graphs respectively depicting reflection characteristics of the first and second partial mirrors 150 and 220 according to the present invention. The first and second partial mirrors 150 and 220 have band selection characteristics. That is, each partial mirror partially reflects an optical signal of a particular band, while transmitting optical signals of other bands.

FIG. 5a is a graph depicting reflection characteristics of the first partial mirror 150. The first partial mirror 150 partially feeds back the first optical signals $\lambda_1$, $\lambda_2$, ... $\lambda_N$ outputted from the central office 100, while transmitting the second optical signals $\lambda_{N+1}$, $\lambda_{N+2}$, ... $\lambda_{2N}$ outputted from respective ONUs 300.

FIG. 5b is a graph depicting reflection characteristics of the second partial mirror 220. The second partial mirror 220 operates in a reverse manner to the first partial mirror 150. That is, the second partial mirror 220 partially feeds back the second optical signals $\lambda_{N+1}$, $\lambda_{N+2}$, ... $\lambda_{2N}$ outputted from respective ONUs 300, while transmitting the first optical signals $\lambda_1$, $\lambda_2$, ... $\lambda_N$ outputted from the central office 100.

Figure 6:
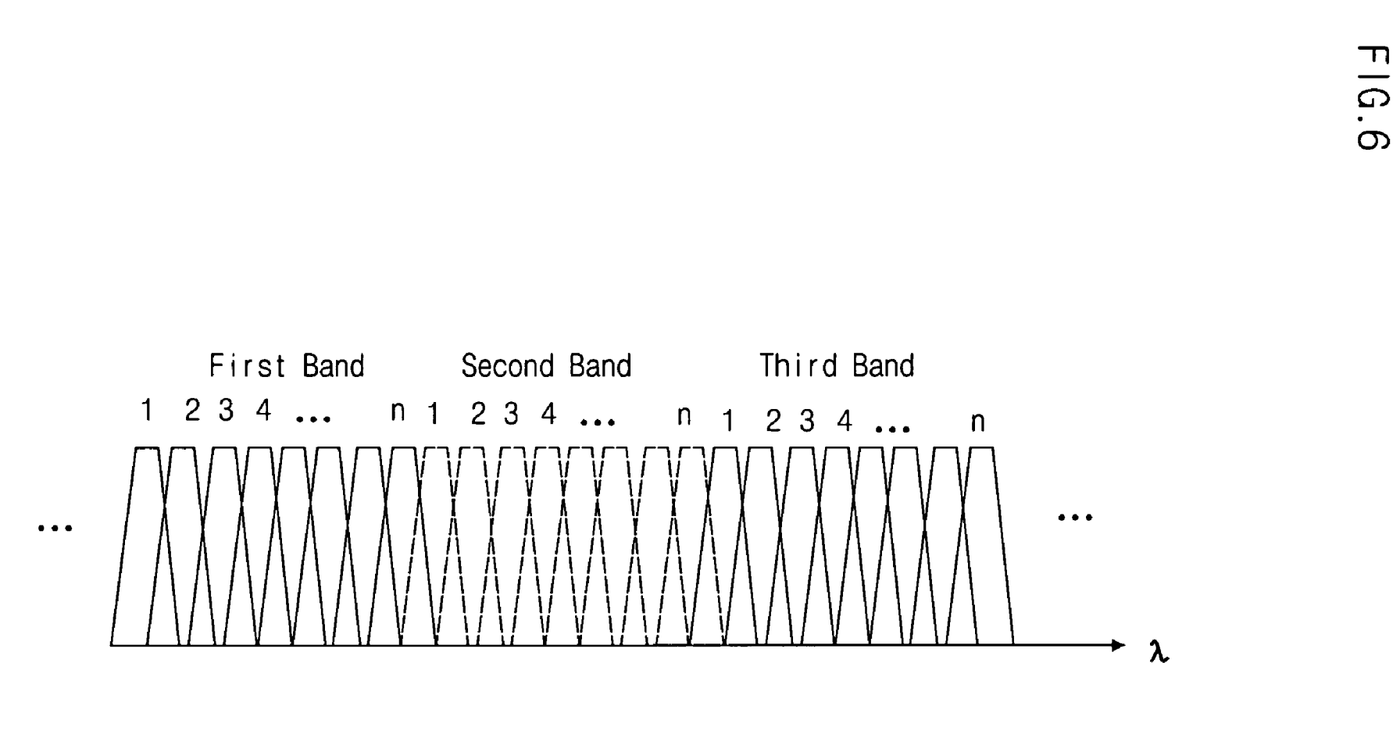
FIG. 6 is a diagram illustrating the frequency transmission characteristics of an AWG type multiplexer/demultiplexer.

FIG. 6 is a diagram illustrating the frequency transmission characteristics of an AWG type multiplexer/demultiplexer. As shown in FIG. 6, the AWG type multiplexer/demultiplexer exhibits periodic frequency characteristics. In the illustrated case, it is possible to minimize wavelength interference occurring in the multiplexer/demultiplexer by assigning $\lambda_1, \lambda_2, \ldots \lambda_N$ as the first band of the multiplexer/demultiplexer while assigning $\lambda_{N+1}, \lambda_{N+2}, \ldots \lambda_{2N}$ as the third band of the multiplexer/demultiplexer.

Meanwhile, forward and backward optical signals have different bands in accordance with the present invention. Accordingly, it is possible to easily separate optical signals of different frequencies. In the illustrated embodiment, the C-band of 1,530 to 1,562 nm is used as a forward band, whereas the L-band of 1,570 to 1,605 nm is used as a backward band. These bands may be selectively varied in accordance with their application.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

As apparent from the above description, optical signals of different wavelengths are partially fed back by a partial mirror in accordance with the present invention, so as to injection-lock respective output wavelengths of Fabry-Perot laser diodes. Accordingly, there is an advantage in that it is possible to apply Fabry-Perot laser diodes to a DWDM-PON system.

It is also possible to minimize the system construction costs, as compared to conventional optical networks, by employing inexpensive Fabry-Perot laser diodes as respective light sources of a central office and ONUs.

What is claimed is:

1. A dense wavelength division multiplexing-passive optical network system utilizing self-injection locking of Fabry-Perot laser diodes, the system comprising:

a central office for generating first optical signals of different wavelengths, and transmitting the first optical signals to a remote node, while receiving second optical signals of different wavelengths from the remote node;

the remote node for demultiplexing a multiplexed signal of the first optical signals transmitted from the central office, and transmitting the demultiplexed first optical signals to respective optical network units (ONUs), the remote node also multiplexing the second optical signals transmitted from respective ONUs, and transmitting the multiplexed signal of the second optical signals to the central office; and the ONUs for receiving the first optical signals transmitted from the remote node, respectively, the ONUs also generating the second optical signals of different wavelengths, and transmitting the second optical signals to the remote node, respectively, wherein the central office includes a first partial mirror adapted to partially feed back the multiplexed signal of the first optical signals transmitted to the remote node, thereby self-injection locking a plurality of first transmitters included in the central office, and wherein the remote node includes a second partial mirror adapted to partially feed back the multiplexed signal of the second optical signals transmitted to the central office, thereby self-injection locking a plurality of second transmitters included in respective ONUs.

2. The dense wavelength division multiplexing-passive optical network system according to claim 1, wherein the central office includes:

the first transmitters for outputting the first optical signals of different wavelengths, respectively;

a plurality of first receivers for receiving the second optical signals transmitted from the remote node, respectively;

a plurality of first multiplexers/demultiplexers each adapted to output the first optical signal received from an associated one of the first transmitters while demultiplexing an associated one of the second optical signals transmitted from the remote node along with a part of the first optical signal fed back thereto;

a second multiplexer/demultiplexer for multiplexing the first optical signals respectively outputted from the first multiplexers/demultiplexers while demultiplexing the multiplexed signal of the second optical signals transmitted from the remote node along with a part of the multiplexed signal of the first optical signals fed back thereto; and the first partial mirror for partially feeding back, to the second multiplexer/demultiplexer, the multiplexed signal of the first optical signals outputted from the second multiplexer/demultiplexer.

3. The dense wavelength division multiplexing-passive optical network system according to claim 2, wherein the second multiplexer/demultiplexer is an AWG type multiplexer/demultiplexer.

4. The dense wavelength division multiplexing-passive optical network system according to claim 2, wherein the first transmitters are injection-locked by the fed-back part of the first optical signals.

5. The dense wavelength division multiplexing-passive optical network system according to claim 1, wherein the remote node includes:

a third multiplexer/demultiplexer for demultiplexing the multiplexed signal of the first optical signals transmitted from the central office while multiplexing the second optical signals transmitted from respective ONUs along with a part of the multiplexed signal of the second optical signals; and the second partial mirror for partially feeding back, to the third multiplexer/demultiplexer, the multiplexed signal of the second optical signals outputted from the third multiplexer/demultiplexer.

6. The dense wavelength division multiplexing-passive optical network system according to claim 5, wherein the third multiplexer/demultiplexer is an AWG type multiplexer/demultiplexer.

7. The dense wavelength division multiplexing-passive optical network system according to claim 1, wherein respective ONUs include:

the second transmitters for transmitting the second optical signals, respectively;

a plurality of second receivers for receiving the first optical signals transmitted from the remote node, respectively; and a plurality of fourth multiplexers/demultiplexers each adapted to output the second optical signal received from an associated one of the second transmitters while demultiplexing an associated one of the first optical signals transmitted from the remote node along with a part of the second optical signal fed back thereto.

8. The dense wavelength division multiplexing-passive optical network system according to claim 7, wherein the second transmitters are injection-locked by the fed-back part of the second optical signals.

* * * * *